Feb. 5, 1935.  G. C. JETT  1,990,328
DRAFT MECHANISM FOR TRAILER WAGONS
Filed March 24, 1933 2 Sheets-Sheet 1
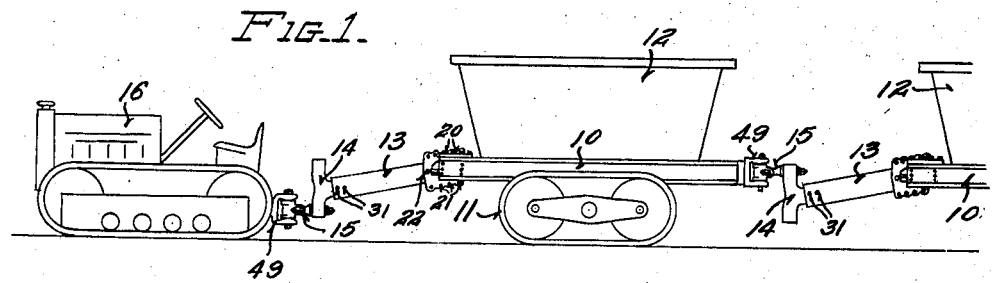
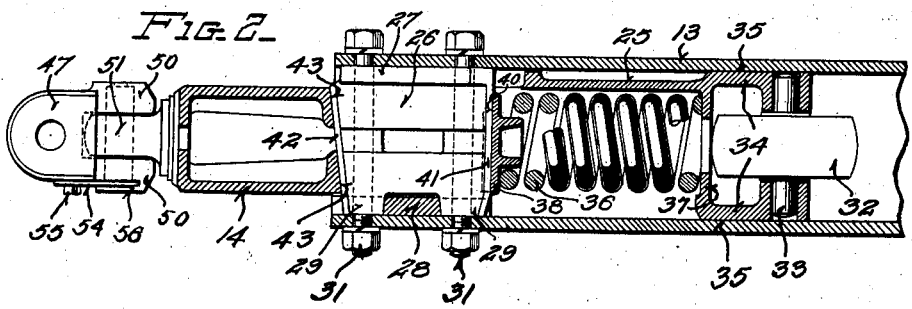
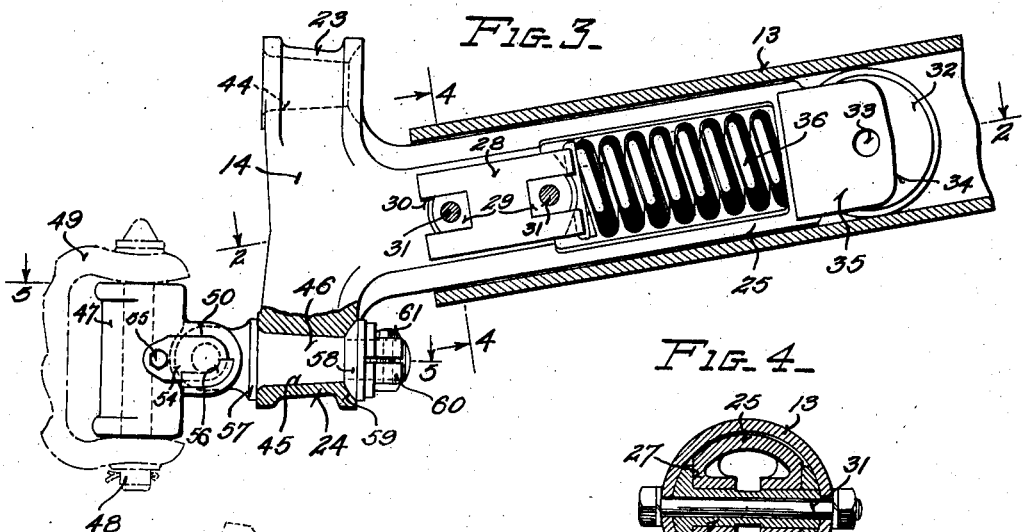
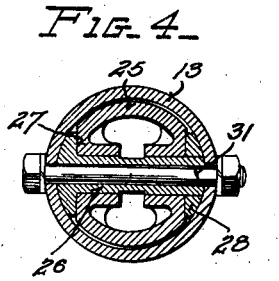
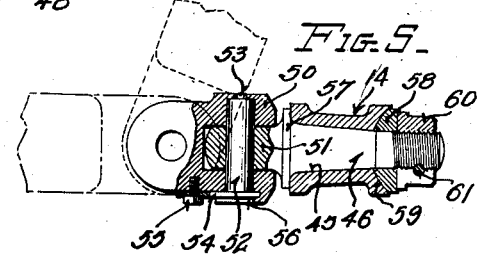
INVENTOR.
GEORGE C. JETT
BY
ATTORNEYS.

Feb. 5, 1935.  G. C. JETT  1,990,328
DRAFT MECHANISM FOR TRAILER WAGONS
Filed March 24, 1933   2 Sheets-Sheet 2
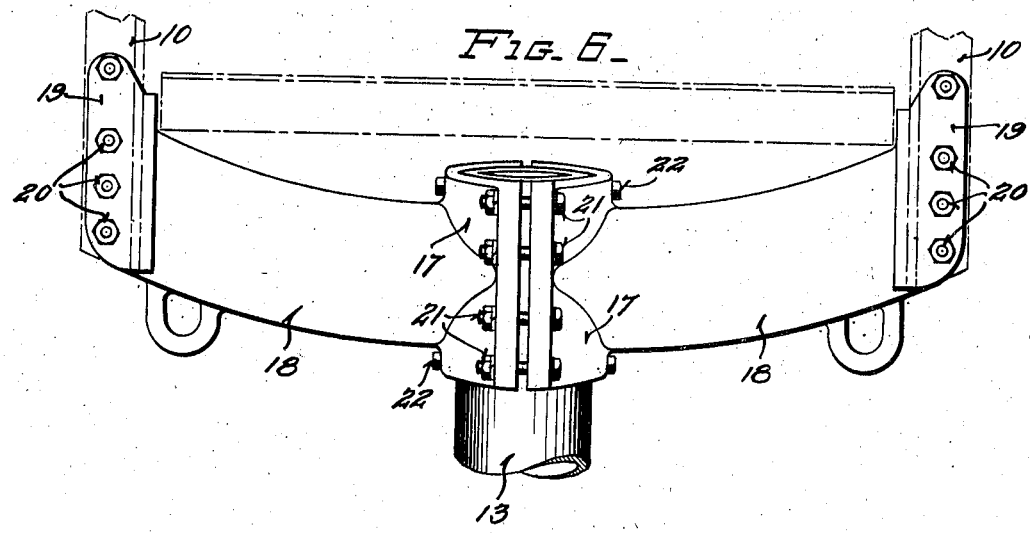
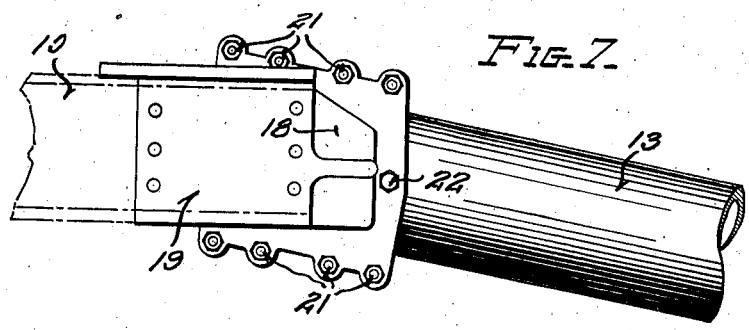
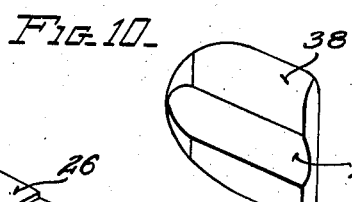
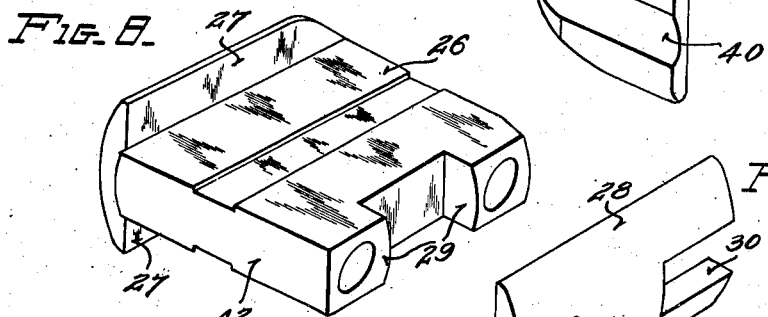
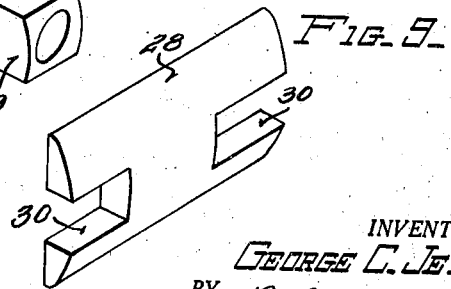
INVENTOR.
GEORGE C. JETT
BY
ATTORNEYS.

Patented Feb. 5, 1935

1,990,328

UNITED STATES PATENT OFFICE 1,990,328

DRAFT MECHANISM FOR TRAILER WAGONS

George C. Jett, Milwaukee, Wis.

Application March 24, 1933, Serial No. 662,446

11 Claims. (Cl. 280—33.9)

This invention relates to draft mechanisms for trailer wagons and primarily for trailer wagons of the cart type.

Trailer wagons of this type, drawn by tractors either singly or in trains, are commonly employed for hauling dirt and like loose materials in excavating or ground filling operations. Each is ordinarily equipped with a rigid tongue which serves not only to draw and steer the wagon with its load, but also to support or steady the same against forward and aft tilting and against side swing. Due to their great weight, ordinarily twenty tons or more when loaded, and due to the extremely irregular ground surface over which they are commonly operated, the tongues of such wagons are subjected to tremendously heavy and shock-like forces and stresses which are transmitted to and ultimately sustained by the connection between each tongue and the leading vehicle by which it is drawn.

One object of the present invention is to provide an improved tongue for wagons of this type and mounting means therefor of rugged, yet simple, and economical design.

Another object is to provide a new and improved separable coupling for releasably hitching the tongue of a trailer wagon to a leading vehicle, and so designed as to securely hold the tongue against swinging, either vertically or laterally, and at the same time afford ample flexibility for turning and for permitting the vehicles to accommdate themselves individually to irregularities in the ground surface.

Another object is to provide a flexible coupling of this character which will permit turning through a maximum angle. The form of coupling hereinafter described will permit the leading vehicle to turn through an angle considerably greater than ninety degrees to the right or left from a straight course, this being made possible by the use of unusually slender elements combined in a novel manner to effect a laterally compact design without sacrificing strength.

Another object is to provide a new and improved separable coupling which is proof against accidental separation but which may readily be separated manually to release the trailer without requiring the use of tools.

Another object is to provide an improved draw head for trailer tongues having a plurality of means, at different elevations, for connection with a leading vehicle, the lower of which may be utilized to couple the tongue to a tractor, and the upper of which may be utilized to couple the tongue to a leading trailer when trailers are connected in train. By this arrangement, compensation is made for the difference in elevation between a tractor draw head and the rear draw head of a leading trailer. These alternative connections are preferably disposed at substantially equal distances above and below the end of the tongue so as to reduce to a minimum the degree of offset of each with respect to the tongue and thereby reduce the magnitude of the stresses resulting from such eccentric loading.

Another object is to provide a resilient draw head for trailer tongues effective to rigidly sustain the same against vertical or lateral play but yieldable in the direction of pull to afford protection against excessive draft loads or shocks. The arrangement is preferably such as to prevent yielding of the draw head in the direction of pull except when subjected to draft loads materially in excess of normal, so as to avoid objectionable oscillations that might otherwise occur if the draw head were permitted to yield to draft loads at or below normal.

Another object is to provide an improved wear resisting and readily replaceable mounting means for the draw head, well able to withstand the severe loads and shocks to which it is subjected without wear or damage to its supporting tongue.

Other objects and advantages will appear, expressed or implied, from the following description of an illustrative embodiment of the present invention.

In the accompanying drawings:—

Figure 1 is a view in side elevation of a portion of a trailer train equipped with draft mechanisms constructed in accordance with the present invention.

Fig. 2 is a longitudinal sectional view, on the line 2—2 of Fig. 3, of a draw head and associated parts shown in Fig. 1.

Fig. 3 is a side elevation, partly in section, of the parts shown in Fig. 2.

Fig. 4 is a sectional view on the line 4—4 of Fig. 3.

Fig. 5 is a detail section of the flexible coupling shown particularly in Figs. 2 and 3.

Figs. 6 and 7 are views in plan and side elevation, respectively, of the mounting means for the trailer tongue shown in Fig. 1.

Fig. 8 is a perspective view of a bearing block, and Fig. 9 is a similar view of an end plate therefor.

Fig. 10 is a perspective view of a spring hanger employed.

Each of the trailer wagons shown, or partially shown, in Fig. 1 includes a conventional base frame 10, rockably supported intermediate its ends upon a pair of crawler tread mechanisms 11 in a well known manner, and carrying a conventional hopper type body 12.

Each wagon is equipped with a tongue 13 carrying a draw head 14 and connected to a flexible coupling 15, all of which are constructed in accordance with the present invention, and through which each is connected either to a conventional tractor 16 or to a preceding wagon.

Each tongue shown at 13 comprises a substantially straight hollow tube which is rigidly fixed at its inner end to the forward end of the wagon frame 10 and which slopes downwardly and forwardly therefrom to an elevation convenient for connection to a tractor.

In this instance the rear or inner end of each tongue 13 is securely gripped between a pair of separable hub sections 17—17 formed upon the inner ends of a pair of heavy header bar sections 18—18, respectively, which extend across the front of the wagon. The bar sections 18—18 are flanged or otherwise fashioned at their outer ends 19 to receive the side members of the wagon frame 10 to which they are securely anchored by bolts 20 or otherwise. The hub sections 17—17 are clamped onto the tongue by bolts 21, and through bolts 22 securely lock the tongue against rotation or withdrawal.

Each draw head 14 shown comprises a substantially T-shaped casting, preferably hollow to economize in weight and material, and having arms 23 and 24 projecting upwardly and downwardly, respectively, from the forward end of a stem 25. The stem 25 is housed within the forward end of the wagon tongue. Each draw head 14 is supported primarily by a bearing block 26, removably fixed in the end of the tongue, and extending horizontally through a longitudinal guideway formed in the forward portion of the stem 25. The stem is laterally confined by and between a pair of upper and lower flanges 27—27, formed along one edge of the block, and a bearing plate 28 removably applied to the opposite edge thereof.

A bearing block 26 and its bearing plate 28 are shown, particularly in Figs. 8 and 9. As indicated therein and in Fig. 4, the external face of the flanged edge of the block is preferably convexly curved to match the internal surface of the tubular tongue, and the outer face of the bearing plate 28 is similarly curved. Lugs 29 projecting from an edge of the block are shaped to extend through and interlock with end slots 30 formed in the plate 28. The bearing block and plate are removably but securely anchored in the tongue by a pair of tie bolts 31, which extend therethrough and through the block and lugs 29. The block, thus anchored, serves not only as a rigid support and guide for the forward portion of the draw head stem 25, but also as an effective reinforcing brace for the open end of the tongue.

The draw head stem 25 is additionally supported at its inner or rear end primarily by a roller 32, mounted upon a horizontal shaft 33, journalled in spaced bearing lugs 34 projecting from the inner end of the stem. The periphery of the roller 32 is transversely curved to match the interior of the tubular tongue 10 and coacts therewith to sustain the inner end of the stem against vertical displacement. The outer surfaces 35 of the bearing lugs 34 are also convexly curved to match the interior of the tongue and they coact therewith to sustain the inner end of the stem against horizontal displacement.

It is of course understood that rotation of the stem 25 about its axis is prevented by the stationary bearing block 26, and particularly by the bearing contact of the flat top and bottom faces of the block against the internal surfaces of the longitudinal guideway in the stem.

The stem 25 is longitudinally slidable on the block 26 so that the draw head 14 is yieldable in the direction of the draft pull. Such action is resisted, however, by a heavy compression spring 36, housed within the stem rearwardly of the block 26. The spring bears at its rear end against the end wall 37 of the stem and at its forward end against a spring hanger 38 seated upon the forward end of the bearing block, so that the draw head stem is yieldably urged rearwardly into the tongue. The spring hanger 38 is preferably grooved, as at 40, to receive the convexly curved rear end face 41 of the bearing block. The forward end face 42 of the bearing block is also preferably convexly curved to match a concave seat 43 formed in the stem which normally bears against the block under the thrust induced by the spring 36.

The initial compression in the spring 36 is preferably such as to hold the draw head 14 and its stem 25 against outward movement except when subjected to draft loads substantially greater than normal. In this instance the spring is under an initial compression pressure of about three thousand pounds effected by the introduction of the bearing block 26 between it and the seat 43. For this purpose, the forward end face 42 of the block is inclined (see Fig. 2) so as to impart to the block a tapered or wedge-like formation, and the seat 43 is similarly inclined, so that when the block is forced laterally along the seat 43 into and through the stem 25, into the position shown, it acts on the spring hanger 38 to compress the spring.

The block 26 and spring 36 are thus assembled within the stem 25, and the bearing plate 28 applied to the edge of the block, prior to insertion of the stem into the open end of the tongue 10. Thereafter, the block 26 is secured in position within the tongue by insertion of the tie bolts 31 therethrough.

Each draw head 14 is provided with upper and lower holes 44 and 45, each adapted to receive the spindle 46 of an appropriate flexible coupling 15 by which it may be separably connected to a leading vehicle. These holes are preferably equally spaced above and below the longitudinal axis of the tongue 13, the lower hole 45 being used for establishing a connection with a tractor and the upper hole 44 being used for establishing a connection with a leading trailer wagon, as indicated in Fig. 1.

The flexible coupling shown is designed to permit the leading vehicle to turn through a maximum angle. It includes a substantially cylindrical, vertically elongated, swivel block 47 mounted to turn freely about a vertical pin 48 releasably mounted within the draw head bracket 49, ordinarily provided at the rear of the leading vehicle. The block 47 carries a pair of parallel ears 50 which project tangentially therefrom and which are spaced apart to receive therebetween an ear 51 carried by the spindle 46. The ears 50 and 51 are hingedly connected by a horizontal pivot pin 52.

The pin 52 projects through one of the ears 50, through the intermediate ear 51, and into a socket formed in the other ear 50, the base of the socket having an opening 53 through which access may be had to the pin 52 to effect its removal. The pin 52 is retained against accidental withdrawal by a latch plate or gate 54, hingedly mounted on a cap screw 55, and engageable beneath a retainer flange 56 when in pin locking position.

The ears 50 and 51, and pin 52, combined in the manner shown, form a relatively narrow knuckle joint, so that the draw head bracket 49 may swing through a very wide angle, as indicated in Fig. 5.

The spindle 46 is preferably longitudinally tapered and each of the holes 44 and 45 are shaped to fit the same but with sufficient clearance to permit free rotation of the spindle therein. The position of the spindle in either hole is fixed by a stop collar 57, formed on the large end thereof, and a bearing washer 58 loosely mounted upon the small end of the spindle sustains the draft load. The washer 58 is preferably provided with a spherical face 59 which bears against a correspondingly shaped seat formed in the draw head 14, and serves to distribute the draft load over that seat. The washer is securely but releasably retained by a split nut 60, threaded on the end of the spindle, and locked in place by a clamp bolt 61, disposed to interengage a groove or notch formed in the spindle.

It will thus be noted that a releasable coupling has been provided which is peculiarly adapted to securely hold the trailer tongue against vertical or side swing and to amply sustain the heavy shock loads transmitted to it from both the leading and trailing vehicles; in which ample bearing surfaces are provided throughout its joints to sustain those peculiar loads with a minimum of wear; and which, at the same time, affords all the flexibility required to permit very sharp turns and to permit both vehicles to accommodate themselves freely to severe irregularities in the ground surfaces over which they are operated in normal use.

By reason of its vertical elongation and consequent extended bearing on the pin 48, and by reason of the very short distance between the pins 48 and 52, the swivel block 47 is well able to sustain the heavy vertical loads eccentrically applied to it through the pin 52. In this instance that portion of the block 47 between the ears 50 is recessed (note the dotted lines in Fig. 3) to accommodate the ear 51, permitting the pin 52 to be placed close to pin 48, the distance between the axes of these pins being materially less than the length of the block 47. By reason of this relationship, those forces necessary to sustain the block 47 against canting, under the vertical load eccentrically applied through the pin 52, are so reduced as to substantially eliminate the premature wear and cutting action on the pin 47 so commonly experienced in couplings heretofore employed for this purpose.

By the use of a pin 52 of headless form, its entire length is available to sustain the heavy loads to which it is subjected; and by the use of retaining means of the type described all projections, which would add to the overall width of the joint at this point and thereby interfere with and limit the hinge action about the pin 48, are eliminated.

It will also be noted that although the spindle 46 is freely rotatable in the draw head 14, it is solidly mounted and well able to sustain the heavy shock-like loads transmitted from the tongue, as well as to sustain the heavy draft loads transmitted through the coupling. As a result of its tapered form, its large forward end provides an extended bearing surface where the load is concentrated, and the reduction in its rear end renders available a greater portion of the thrust sustaining face of the collar 58 to sustain the draft load. The self adjusting feature of the collar 58, with its spherical face 59, centralizes the draft load on the nut 60, and by clamping the nut 60 on the threads of the spindle all wear on the threads is eliminated.

Various changes may be made in the embodiment of the invention hereinabove specifically described without departing from or sacrificing the advantages of the invention as defined in the appended claims.

I claim:—

1. In a cart type trailer wagon having a base frame, the combination of a pair of header bar sections arranged end to end and together spanning the front of said wagon, each of said sections having a flanged outer end rigidly secured to said frame, a tongue having an inner end gripped by and between the inner ends of said sections, and a draw head carried by the outer end of said tongue.

2. In a trailer wagon having a base frame, the combination of a pair of header bar sections arranged end to end and together spanning the front of said wagon, each of said sections having a flanged outer end rigidly secured to said frame, mating hub sections carried by the inner ends of said bar sections, a tongue having an inner end gripped by and between said hub sections, and a draw head carried by the outer end of said tongue.

3. In a cart type trailer wagon having a base frame, the combination of a pair of header bar sections arranged end to end and together spanning the front of said wagon, said sections being rigidly secured at their outer ends to said frame, mating hub sections carried by the inner ends of said bar sections, a tongue having a rear end fixed in said hub sections and sloping downwardly and forwardly therefrom, and a draw head carried by the forward end of said tongue.

4. In a cart type trailer wagon having a base frame, the combination of a pair of header bar sections arranged end to end and together spanning the front of said wagon, said sections being rigidly fixed at their outer ends to said frame, hub sections carried by the inner ends of said bar sections, a tubular tongue having a rear end gripped by and between said hub sections and sloping downwardly and forwardly therefrom, and a draw head mounted in the forward end of said tongue.

5. The combination with a cart type trailer wagon having a tubular tongue rigidly attached thereto, of a draw head having a supporting stem mounted for longitudinal movement within the forward end of said tongue, resilient means housed in said tongue for resisting such movement, and vertically spaced means on said head for alternatively receiving a draft connection.

6. The combination with a cart type trailer wagon having a rigid tongue provided with a hollow forward end, of a draw head having a supporting stem housed in the forward end of said tongue, and a bearing block fixed in the forward end of sad tongue, said stem being supported at its forward end by said block and at its rear end by the interior of said tongue, said block and stem having bearing surfaces coacting to prevent rotation of said head relative to said tongue.

7. The combination with a cart type trailer wagon having a rigid tongue provided with a hollow forward end, of a draw head having a supporting stem housed in the forward end of said tongue, a bearing member fixed in said tongue and extending horizontally through the forward portion of said stem to support the latter, and means at the rear portion of said stem coacting with the interior of said tongue to further support said stem.

8. The combination with a trailer wagon having a tongue provided with a hollow forward end, of a draw head having a supporting stem longitudinally movable in the forward end of said tongue, a bearing member fixed in said tongue and extending through the forward portion of said stem to slidably support and guide the latter, resilient means coacting with said member and stem to yieldably resist longitudinal movement of said stem, and a roller carried by the rear end of said stem and coacting with the interior of said tongue to restrain the rear end of said stem against vertical displacement.

9. The combination with a trailer wagon having a tongue provided with a hollow forward end, of a draw head having a supporting stem longitudinally movable in the forward end of said tongue, a bearing member fixed in said tongue and extending through the forward portion of said stem to slidably support and guide the latter, and a compression spring coacting with said member and stem to yieldably resist longitudinal movement of said stem, said member having an inclined face coacting with said stem to compress said spring upon insertion of said member into said stem.

10. A cart type trailer wagon having a rigid tongue, a draw head on said tongue having a longitudinally tapered hole therein, a correspondingly tapered spindle journalled horizontally in said hole, a stop collar on the large forward end of said spindle, a thrust collar loosely mounted on the small rear end of said spindle, thrust sustaining means for releasably retaining said thrust collar on said spindle, and means for flexibly coupling said spindle to a leading vehicle.

11. A cart type trailer wagon having a rigid tongue, a draw head on said tongue, a spindle journalled horizontally in said head, a stop collar on the forward end of said spindle, a split nut clamped onto the rear end of said spindle, a thrust collar rockably engaged with said head and coacting with said nut to transmit and apply a draft load to and centrally of said nut, and means for flexibly connecting said spindle to a leading vehicle.

GEORGE C. JETT.